W. P. GELABERT.
HORSE COLLAR.
APPLICATION FILED FEB. 26, 1913.
1,078,140.
Patented Nov. 11, 1913.
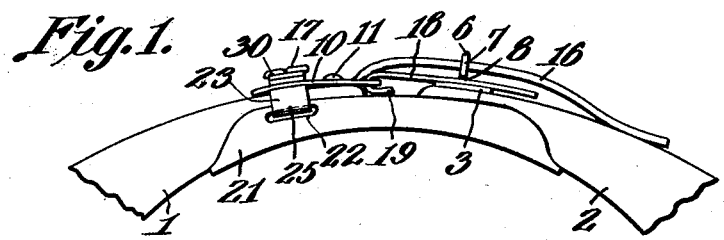
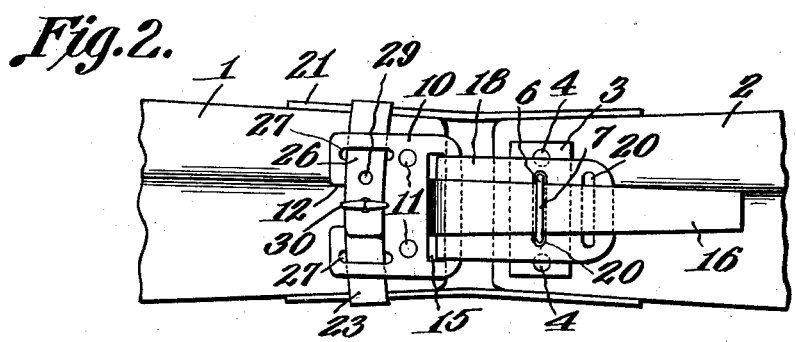
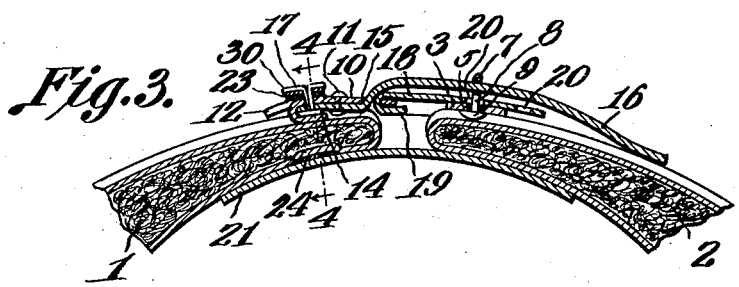
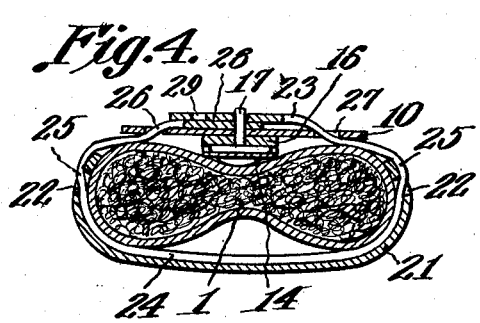
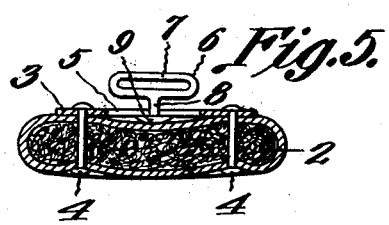
Witnesses
W. P. Gelabert,
Inventor
by C. A. Snow & Co.
Attorneys

UNITED STATES PATENT OFFICE.

WILLIAM PETER GELABERT, OF FULTON, MISSOURI.

HORSE-COLLAR.

1,078,140.  Specification of Letters Patent.  Patented Nov. 11, 1913.

Application filed February 26, 1913. Serial No. 750,900.

*To all whom it may concern:*

Be it known that I, WILLIAM P. GELABERT, a citizen of the United States, residing at Fulton, in the county of Callaway and State of Missouri, have invented a new and useful Horse-Collar, of which the following is a specification.

The device forming the subject matter of this application, is a means for connecting the ends of a horse collar, the device being so constructed that the pad is held thereby upon the collar.

One object of the invention is to provide novel means for connecting the ends of the collar.

Another object of the invention is to provide novel means for holding the pad upon the collar.

The invention aims, further, to provide a novel coöperation between the locking means which holds the ends of the collar, and the means whereby the pad is held upon the collar.

It is within the scope of the invention to improve generally, and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawing:—Figure 1 shows the invention in side elevation; Fig. 2 is a top plan; Fig. 3 is a longitudinal section; Fig. 4 is a transverse section on the line 4—4 of Fig. 3; and Fig. 5 is a transverse section of one end of the collar, sundry parts of the locking mechanism appearing in elevation.

In the drawings, one end of the horse collar is shown and denoted by the numeral 1, the other end of the horse collar being denoted by the numeral 2. A plate 3 extends transversely of the end 2 of the collar, the plate 3 being held in place by rivets 4 or in any other appropriate manner. The plate 3 is provided with a transverse slot 5.

The invention further includes a keeper denoted generally by the numeral 6, the keeper comprising an open, looped shaped head 7 and a shank 8, the shank 8 being rotatably mounted in the slot 5 of the plate 3. The shank 8 terminates in a button 9 which is disposed below the plate 3, the obvious function of the button 9 being to retain the keeper 6 in the plate 3.

Mounted upon the end 1 of the collar 1 is an attaching member which may take the form of a plate 10, held in place by means of rivets 11. In the rear end of the plate 10 there is a notch 12, and the material which is freed in forming the notch 12 is bent forwardly to form a lip 14 which lies beneath the attaching plate 10, this detail being most clearly discernable in Fig. 3. The attaching plate 10 is provided adjacent its forward end with a transverse slot 15. A flexible locking tongue 16 is provided, the same ordinarily being fashioned from leather. The tongue 16 is extended through the slot 15 so that the rear end of the tongue lies beneath the attaching plate 10 and above the lip 14. A fastening device 17 which may be a rivet or cotter pin extends through the rear end of the tongue 16 and through the attaching plate 10. The lip 14 lies below one end of the fastening device 17 and constitutes an abutment therefor.

A holding tongue 18 is provided, the same ordinarily being fashioned from metal. At its rear end, the tongue 18 terminates in a hook 19 which is pivotally engaged in the slot 15 of the attaching plate 10. The tongue 18 is provided with one or more transverse openings 20, any one of which openings, for the purpose of adjustment, is adapted to receive the head 7 of the keeper 6. The free end of the tongue 16 lies on top of the tongue 18 and is extended through the open head 7 of the keeper 6, as shown in Figs. 2 and 3. When the keeper 6 is engaged in the opening 20 in the tongue 18, a separation of the ends 1 and 2 of the collar will be prevented, and the tongue 18 will be prevented from swinging off the keeper 6 by reason of the fact that the tongue 16 is engaged through the head 7 of the keeper.

The invention further includes a trough shaped pad 21. One end of the pad 21 receives the end 2 of the collar, and the other end of the pad is connected with the end 1 of the collar by a mechanism which will now be described. The pad 21 is equipped adjacent one end and near its upper edges with openings 22. A tie 23 is provided, which may be a strap of metal. As indicated at 24 and shown most clearly in Fig. 4, the intermediate portion of the tie 23 lies between the pad and the end 1 of the collar. As shown at 25, the free ends of the tie 23 are extended outwardly through the openings 22 in the pad. The ends of the tie 23 pass thence beneath the edges of the attaching plate 10, and are extended outwardly, as shown at 26, through openings 27 in the plate 10. The ends of the tie 23 are overlapped upon each other and are disposed on top of the plate 10, as indicated at 28. In the ends of the tie 23 there are openings 29 adapted to be engaged by the fastening device 17, and the end of the fastening device is clenched down, as indicated at 30, upon the overlapped ends 28 of the tie 23, this detail being most clearly disclosed in Fig. 2.

From the foregoing it will be seen that the device hereinbefore described comprises a novel means for holding the ends 1 and 2 of the horse collar together, a novel means being provided for maintaining the pad 21 assembled with the end 1 of the collar. The parts of the two mechanisms above described, coöperate in a novel manner to reinforce the entire structure.

Having thus described the invention, what is claimed is:—

1. In a device of the class described, a collar; an attaching member on one end of the collar; means for detachably uniting the attaching member with the other end of the collar; a pad applied to the first specified end of the collar; a tie connected to the pad and extended across the attaching member; a fastening device connecting the tie with the attaching member; the attaching member having a tongue extending beneath the fastening device.

2. In a device of the class described, a collar; an attaching member on one end of the collar; means for detachably uniting the attaching member with the other end of the collar; a pad applied to the first specified end of the collar; the pad being provided with openings; a tie, the intermediate portion of which is located between the pad and the first specified end of the collar, the ends of the tie being extended outwardly through the openings in the pad and being extended beneath the attaching member, there being openings in the attaching member, through which openings the ends of the tie are outwardly extended, the ends of the tie being overlapped upon the top of the attaching member and a fastening device connecting the overlapped ends of the tie with the attaching member.

3. In a device of the class described, a collar; an attaching member on one end of the collar; means for detachably uniting the attaching member with the other end of the collar; a pad applied to the first specified end of the collar, the pad being provided with openings; a tie, the intermediate portion of which is located between the pad and the first specified end of the collar, the ends of the tie being extended outwardly through the openings in the pad and being extended beneath the attaching member, there being openings in the attaching member, through which openings the ends of the tie are outwardly extended, the ends of the tie being overlapped upon the top of the attaching member, and a fastening device connecting the overlapped ends of the tie with the attaching member; the attaching member being provided with a tongue which is extended beneath the fastening device.

4. In a device of the class described, an attaching member provided with an opening; a holding tongue pivotally mounted in the opening and provided with an aperture; a keeper engaged in the aperture; a flexible locking tongue engaged beneath the attaching member and having its free end extended outwardly through the opening, the free end of the locking tongue being engaged through the keeper.

5. In a device of the class described, an attaching member; a holding tongue pivoted to the attaching member; a keeper engaged with the holding tongue; a flexible locking tongue extended through the keeper, one end of the locking tongue lying adjacent the attaching member, the attaching member being provided with a lip extended beneath the locking tongue; and a fastening device connected with the locking tongue and with the attaching member, the lip constituting an abutment for the fastening device.

6. In a device of the class described, an attaching member; a tongue; a tie; a single means uniting the attaching member, the tie and tongue; a keeper coöperating with the tongue; and a pad engaged by the tie.

In testimony that I claim the foregoing as my own, I have hereto affixed my signature in the presence of two witnesses.

WILLIAM PETER GELABERT.

Witnesses:
  J. A. McPherson,
  I. W. Holman.

---

Copies of this patent may be obtained for five cents each, by addressing the "Commissioner of Patents, Washington, D. C."